Fig. 1

> United States Patent Office 3,306,870
Patented Feb. 28, 1967

3,306,870
FLUID GELABLE COMPOSITION OF ACRYL-
AMIDE POLYMERS AND AQUEOUS SOLU-
TIONS OF INORGANIC HYDROXIDES AND
SALTS
Louis H. Eilers and Christ F. Parks, Tulsa, Okla., assignors to The Dow Chemical Company, Midland, Mich., a corporation of Delaware
Filed June 1, 1964, Ser. No. 371,665
42 Claims. (Cl. 260—29.6)

The invention is a new and improved gelable polymer composition, the resulting gelled composition, and method of use.

A fluid composition which solidifies in place to form a liquid-tight, air-tight seal has long been a basic need in a number of lines of endeavor. Uses for such composition include: cementing casings of wells penetrating an underground formation to secure them to the formation wall; making seals about a casing or a shaft liner to inhibit liquid or gas seepage between the casing or shaft liner and the formation wall; grouting to provide filler or support between the exposed surface or face of an underground cut or excavation and a structural wall therein such as may be needed in the construction of aqueducts, tunnnels, sewers, road beds and the like; and plugging off or providing impermeable spacers in conduits generally.

The term, well, generally and as used herein, refers to relatively small-diameter holes penetrating the earth, usually for the purpose of obtaining fluids from underground deposits, including stored gases in depleted reservoirs and also including solubilizable solids adaptable for solution mining such as salt. The term, shaft, as used herein, refers generally to somewhat larger holes penetrating the earth, circular, rectangular, or polygonal, through which machines, tools, personnel, supplies, and solids, e.g. ore, salt, stone, and the like may be lowered or raised. In either a well or a shaft, provision is made against sloughing of the earthen wall and in the case of the wells, also to provide a continuous conduit for fluid flow. Such provision in wells is usually described as a casing and in shafts as a shaft liner. Casings are commonly of metal whereas shaft liners may be of wood, concrete, metal, or a combination thereof. Retaining walls used in underground activities in surface excavations are sometimes referred to as shoring.

Grouting refers broadly to forcing a deformable gelable or settable dispersion or slurry behind or under a structure such as a wall, floor, shoring, or the like to fill in or support a structure.

When a well or shaft is drilled or sunk into the earth, it usually traverses fluids in place, e.g. underground streams or reservoirs of liquid, or gas pockets. Such fluids are held normally in place by substantially impervious rock strata. When the well or shaft is drilled it penetrates the impervious rock. Thereafter the formerly entrapped fluid, thus released, tends to trickle down the well or shaft or, in the case of gas, to migrate upwardly therein. Providing a casing or a shaft liner alone is usually not sufficient to stop such trickle or migration since some space invariably still exists between the casing or shaft liner and the formation wall. The seepage or migration usually increases in rate and volume as time passes due to erosion, dissolution, and chemical action until serious damage ensues. The situation is most serious when personnel and specialized equipment are employed at the bottom of the shaft. Illustrative of such situation is that which occurs when an enlarged cavern has been formed at the bottom of a relatively large-diameter shaft. In some instances, testing procedures of explosives (not conveniently or safely carried on above ground) are conducted in such cavern which is frequently formed in a salt deposit.

In attempts to inhibit the undesirable seepage and migration of fluids between the formation wall and the casing or shaft liner, various types of sealant compositions have been employed, including cement, resinous mixtures, cellulosic materials, and flake, granular, and shredded packing materials, and various combinations and variations thereof. However, such attempts have not been fully successful because commonly employed cements and resinous mixtures tend to contract or shrink during set and most particulated packing materials do not remain fluid-tight for a sufficient length of time and thereby fail to seal off completely the space adjacent the formation wall. Accordingly the problems stemming from the fluid seepage continue to exist.

The material for wide acceptance as a sealant is preferably a pumpable liquid which can be easily emplaced as desired and which thereafter gels or solidifies within a satisfactory length of time to form a fluid-tight (i.e. gastight or liquid-tight) seal. Although some sealant compositions currently in use have proved satisfactory under certain conditions, they have fallen short of meeting demands presented in a number of situations because they contract during set or are adversely affected by dissolution, degradation, softening, or erosion after emplacement.

A need therefore exists for a sealant which does not shrink during the gelation or solidification period and which preferably increases its cross-sectional area upon being subjected to additional pressure or to contact with fluid sought to be sealed off.

The invention provides an aqueous-base sealant composition which is readily pumpable, is easily emplaced, and which gels during a controlled pre-determined period of time, at a temperature between the freezing point and the boiling point of the aqueous component thereof, which broadly usually falls between about 10° F. and about 210° F. (and higher temperatures at greater than atmospheric pressure). The resulting gelled composition is resilient and increases its cross-sectional area when subjected to pressure. It also possesses the added desirable property of swelling after gelation when contacted with either water, natural brines of the type commonly encountered underground, or synthetic brines of high density.

The invention also provides a method of sealing off passageways including seepage channels between a formation wall and a shaft liner or well casing about a shaft or well penetrating the formation, the annulus between a tubing and casing of a well, and for providing support, filler, and sealant between an exposed earthen face and the walls or floor of an aqueduct, tunnel, sewer, concrete highway, or the like.

One embodiment of the invention is a pumpable gelable composition having a controlled rate of gelation to provide adequate time for injection or emplacement, as needed, which comprises a dispersion of an acrylamide-type polymer and an aqueous solution of a water-soluble inorganic base or salt or mixture of salts of sufficient concentration and solubility to decrease the aqueous tension to a sufficiently low value, as explained more fully hereinafter.

A second embodiment of the invention is the resulting gelled solid composition to which the liquid dispersion is converted upon standing.

A third embodiment of the invention is a method of closing off or plugging passageways, channels, and conduits in general and more particularly a method of sealing off, reinforcing, or providing a substantially water-impermeable filler in spaces or openings which exist between shaft liners, well casings, tunnel walls, pavement, and mine shoring, or the like on the one hand and the face of an earthen formation which is penetrated, traversed, or surfaced by the shaft, well, tunnel or pavement on the other.

The acrylamide polymer to employ in the invention may be a linear or crosslinked polyacrylamide or mixture thereof or water-dispersible copolymer resulting from the polymerization of a major proportion of acrylamide and a minor proportion of an ethylenically unsaturated monomer copolymerizable therewith, e.g. a copolymer of from 90 to 99 percent acrylamide and from 1 to 10 percent of a monomer selected from the class consisting of acrylic acid, methacrylic acid, vinylsulfonic acid, vinylbenzylsulfonic acid, vinylbenzenesulfonic acid, and alkali and alkaline earth metal salts of such acids, as described in U.S. Patent 2,831,841, column 3, lines 34 to 45, and in U.S. Patent 2,909,508, Examples 1 to 5.

The polymer employed may have a molecular weight of from about 10,000 to about 5,000,000. It usually has a molecular weight of between about 500,000 and 3,000,000. Some of the carboxamide groups of the polymer may have been converted by hydrolysis to carboxylate groups. Almost invariably some carboxylate groups exist and may vary from less than 1 percent by weight of the polymer to commonly 4 or 5 percent and, by controlled conditions of preparation and modification, be present in amounts as high as 40 percent or more by weight of the polymer. For use in the practice of the invention, in general the molecular weight is not highly critical. The lower molecular weight polymer appears to gel somewhat faster than the higher molecular weight. The extent of hydrolysis, however, has a marked effect upon the rate of gelation in the practice of the invention. The greater the hydrolysis of the polymer, the longer the gel time resulting when admixed with an aqueous solution of a specified salt at a given concentration and at a given temperature. An acrylamide polymer which has between about 1 and about 30 percent of the carboxamide groups hydrolyzed to carboxylate groups is preferred.

Linear polyacrylamide may be prepared by polymerizing acrylamide in the presence of a small but effective amount of a water-soluble oxygen-containing catalyst, e.g. a thiosulfate or bisulfate of potassium or sodium or an organic hydroperoxide, in an aqueous solution at between about 30° and 80° C., whereby the polymer is produced. The polymer so produced is then separated from the water, as by drum drying, and is subsequently ground to a desired particle size. The particle size preferred is such that about 90 percent by weight will pass through a number 10 mesh sieve and not more than about 10 percent will be retained on a 200 mesh sieve (U.S. Bureau of Standards Sieve Series). In the practice of the invention, the smaller particle size under a given set of conditions gels somewhat faster than does the larger particle size.

The cross-linked acrylamide-type polymer is prepared in general according to the procedure set out above but contains, in the monomeric mix, between about 500 and about 5000 parts by weight of a water-soluble cross-linking agent per million parts of acrylamide. A cross-linking agent commonly employed is an alkylidene bisacrylamide of which methylenebisacrylamide is usually preferred. Cross-linking of acrylamide may also be effected by ultraviolet light, X-rays, gamma rays, or high energy electrons such as are produced by a Van de Graaff accelerator or "cobalt 60."

Other methods of preparing polyacrylamide are also known, e.g. as described in British Patent 475,671. Methods of preparing monomeric acrylamide are well known. Basic teachings in this art may be found in French Patent 898,275 granted April 8, 1945.

The water-soluble inorganic compound to employ in the practice of the invention is selected from bases and salts which, when admixed with water, lower the aqueous tension of water to a positive aqueous tension value which is not greater than about 10 millimeters of mercury at the temperature at which the invention is being carried out. This aqueous tension value of 10 millimeters of mercury or less is applicable with any degree of hydrolysis of the polyacrylamide polymer within the aforementioned limits, when the aqueous salt solution is chosen from those comprising mono or polyvalent cations. The term polyvalent as used herein refers to those cations having a volume of 2 or greater. However, as the degree of hydrolysis of the polymer is increased, the upper limit of aqueous tension can be raised from 10 millimeters of mercury or less to a value of 20 millimeters of mercury or less, when polyvalent cations capable of cross-linking the polymer are present.

As an example of this, when a polyacrylamide polymer having about 1 to 3% of the carboxamide groups converted by hydrolysis to carboxylate groups is admixed with a 25% by weight $CaCl_2$ solution in an amount of 4 lbs. per gallon of slurry, gelation occurs in less than one minute; this rate of gelation is too fast to be preferable. The aqueous tension of a 25% $CaCl_2$ solution is 17.7 millimeters of mercury. If an equivalent amount of a polyacrylamide polymer hydrolyzed to about 30% is similarly tested in an identical solution, the gelation time is about 1450 minutes. If the concentration of $CaCl_2$ solution is decreased to 20% (aqueous tension of 20 millimeters of mercury) and 30% hydrolyzed polymer is employed, the gel period is about 540 minutes. These gelation periods are operable for this invention. In contrast to the above, and to demonstrate the effect of the polyvalent cation, similar tests were performed with the 30% hydrolyzed polymer in a 26% NaCl solution. This solution had an aqueous tension of 18 millimeters of mercury, yet the system gelled in less than about one minute. (The aqueous tension of pure water in millimeters of mercury at 10° C. is 9.21; at 20° C. it is 17.53; at 24° C. it is 22.37; at 48° C. it is 83.71.)

Factors which appear to affect the capacity of the inorganic compound to lower the aqueous tension are: the extent of its solubility in water; its tendency to form hydrous oxides of the metal present; the temperature of the aqueous solution; and the mutual effect of two or more compounds in the aqueous solution employed. A further factor of significance is the apparent capacity of some multivalent metallic ions in an aqueous solution of the polymer to cross-link the polymer, apparently forming linkages in some manner between groups already present in the polymer or which are formed in the dispersion.

Many of the salts employed commonly exist as the hydrates. The use of the hydrated salt in such instances is quite acceptable. However, in calculating percents by weight herein, only the weight of the salt (not including the hydrated water) is considered.

Unless the salt is sufficiently soluble to go into solution to an appreciable extent, the aqueous tension will not be sufficiently lowered. The greater extent to which hydrous oxides of the metal are formed, the less water will be available to gel the polymer. The higher the temperature, the greater the aqueous tension and the greater amount the aqueous tension must be lowered to reach a value of about 10 millimeters of mercury. Although the invention is not to be construed as based upon any theory, it appears that such metallic ions as $Fe^{3+}$, $Al^{3+}$, $Ti^{3+}$, $Ti^{4+}$, $Zn^{2+}$, or $Sn^{4+}$, $Ca^{2+}$, $Mg^{2+}$ appear to cross-link certain groups present. (It is postulated that the carboxylate groups present, of which, as aforesaid, there is usually at least a fraction of a percent thereof present, may be illustrative of such groups.)

Although, the theory of how or why the gelation of the polymer occurs as desired is not a part of the invention, it appears that the cross-linking attained by the presence of the multivalent metallic ions form macromolecules with the polymer which then appears to possess a toughened membrane-like exterior that resists the passage or osmosis of water, and particularly of a salt solution therethrough, and hence desirably delays the gelation of the polymer. This possibly contributes to the synergistic effect of such ions as $Fe^{3+}$ or $Al^{3+}$ in combination with soluble salts of calcium or magnesium, the $Fe^{3+}$ or $Al^{3+}$ forming a cross-link between polymer molecules and increasing the resistance to osmosis and the calcium or magnesium salts present decreasing the mobility of water and hence the ability thereof to pass through the membranes of the macromolecules. However, the calcium and magnesium ions may also function in a cross-linking capacity.

Two where the amount of polymer was varied for purposes of evaluating the effect thereof.

Series One.—Tests 1 to 5

This series of tests was made to show the effect on gel time when the polymer is admixed with aqueous solutions containing either 40 percent $CaCl_2$ or 43.89 percent $FeCl_3$ or varying proportions of both $CaCl_2$ and $FeCl_3$. The tests were conducted at room temperature which was about 80° F. The results are tabulated in Table I and plotted in FIGURE 1 of the drawing.

TABLE I.—GEL TIME AT 80° F. OF 4 POUNDS OF POLYMER PER GALLON OF AQUEOUS SLURRY OF $CaCl_2$, $FeCl_3$, AND VARYING CONCENTRATIONS OF BOTH $CaCl_2$ AND $FeCl_3$.

| Test No. | Percent $CaCl_2$ | Percent $FeCl_3$ Employed to give Stated Gel Times | | | | | | |
|---|---|---|---|---|---|---|---|---|
| | | Less than 2 Minutes [1] | 0.5 hour | 1 hour | 2 hours | 4 hours | 8 hours | 24 hours |
| 1 | 40 | | None | 1.00 | 2.0 | 3.0 | (Not determined) | |
| 2 | 30 | 0 | 2.85 | 3.99 | 5.13 | 6.04 | 7.33 | 8.74 |
| 3 | 20 | 0 | 9.86 | 10.83 | 11.74 | 12.71 | 13.68 | 15.16 |
| 4 | 10 | 0 | 16.13 | 16.74 | 18.81 | 20.24 | 21.66 | 23.65 |
| 5 | 0 | 25.0 | 30.46 | 31.06 | 35.74 | 37.78 | 40.24 | 43.89 |

[1] For practical purposes, the gel was almost immediate.

Examples of compounds that may be used to prepare the aqueous solution to which the polymer is added, in the practice of the invention, are nearly saturated or substantially saturated aqueous solutions of NaOH, KOH, $CaCl_2$, $MgCl_2$, $SrCl_2$, $FeCl_3$, LiCl, $TiCl_4$, $SnCl_4$, KF, NaI, KI, $Mg(NO_3)_2$, $K_2CO_3$, $KC_2H_3O_2$, $Fe(SO_4)_3$, $ZnCl_2$, $Zn(NO_3)_2$, $K_2CO_3$, $CuSO_4$ and mixtures thereof. The salts KCl, $NH_4Cl$, NaBr and $LiNO_3$ may be used in conjunction with any of the aforementioned to prepare aqueous solutions; however, these salts are insufficiently soluble to give the required aqueous tension values when used alone. The inorganic compounds are commonly added as the hydrates, e.g. $CaCl_2 \cdot 6H_2O$, $SrCl_2 \cdot 6H_2O$, $$Mg(NO_3)_2 \cdot 6H_2O$$

$NaI \cdot 2H_2O$, $LiNO_3 \cdot 3H_2O$, $K_2CO_3 \cdot 2H_2O$, $KF \cdot 2H_2O$, $KC_2H_3O_2 \cdot 1\frac{1}{2}H_2O$, and $NaOH \cdot H_2O$. Various combinations of salts show a synergistic effect on the retardation of the gel time, e.g. $CaCl_2$ or $Ca(NO_3)_2$ and $FeCl_3$; $MgCl_2$ or $Mg(NO_3)_2$ and $FeCl_3$, $FeNO_3$, $AlCl_3$ or $Al(NO_3)_3$.

It must be borne in mind that not any proportions of the above suggested salts are satisfactory for the practice of the invention, but only such proportions as will provide the aforementioned aqueous tension value of about 10 to 20 millimeters of mercury as previously described, which is not to be greater than about 10 at the temperature of the polymer dispersion. There is thus insured a gelation period, at the temperature being employed, which is sufficiently long to position or emplace the fluid composition and yet which is not impractically long. A combination of salts is preferred which will gel the polymer employed, i.e. will convert the fluid dispersion to a solid, in not less than about 0.5 hour but usually not greatly in excess of about 96 hours. The gel time of any given polymer in a specific aqueous solution can be shortened or lengthened by increasing or decreasing the temperature, respectively.

Reference to the following series of tests and tabulated results thereof will aid in the judicious selection of acceptable hydroxide, salt, or salt mixture to employ at a specified temperature. In the tests, the polymer employed was prepared by polymerizing acrylamide with about 4600 parts of methylenebisacrylamide per million parts of the acrylamide. It was employed in the tests in an amount of 4 pounds of the polymer per gallon of the aqueous slurry of hydroxide or salt, except those of Series Reference to Table I shows that when the polymer is admixed with an aqueous salt solution consisting of either 40 percent $CaCl_2$ only or of 30.46 percent $FeCl_3$ only, the polymer gelled in about 0.5 hour. It also shows that when either only $CaCl_2$ or only $FeCl_3$ is present in an amount substantially less than 40 percent of $CaCl_2$ or 30 percent of $FeCl_3$, the gel is very fast, 30 percent $CaCl_2$ or 25 percent $FeCl_3$ solutions gelling the polymer almost at once.

Table I further shows that when both $CaCl_2$ and $FeCl_3$ are present, in an amount sufficient to provide about the same total solids as either $CaCl_2$ or $FeCl_3$ alone, the gel time is definitely increased. For example, an 0.5 hour gel is obtained when about 26.13 percent total solids, made up of 10 percent $CaCl_2$ and 16.13 percent $FeCl_3$, are present or when 29.86 percent total solids, made up of 20 percent $CaCl_2$ and 9.86 percent $FeCl_3$, are present. In addition to a desirable variance in gel time, the presence of even small amounts of iron produces a composition which when set has improved properties of toughness and resilience.

The table further shows that as the percent of either $CaCl_2$ or $FeCl_3$ is increased, when used in combination, the gel time is increased. It particularly shows that when the concentration of $CaCl_2$ is held constant and additions of $FeCl_3$ increased in successive tests, the gel time is extended very markedly.

Figure 1:
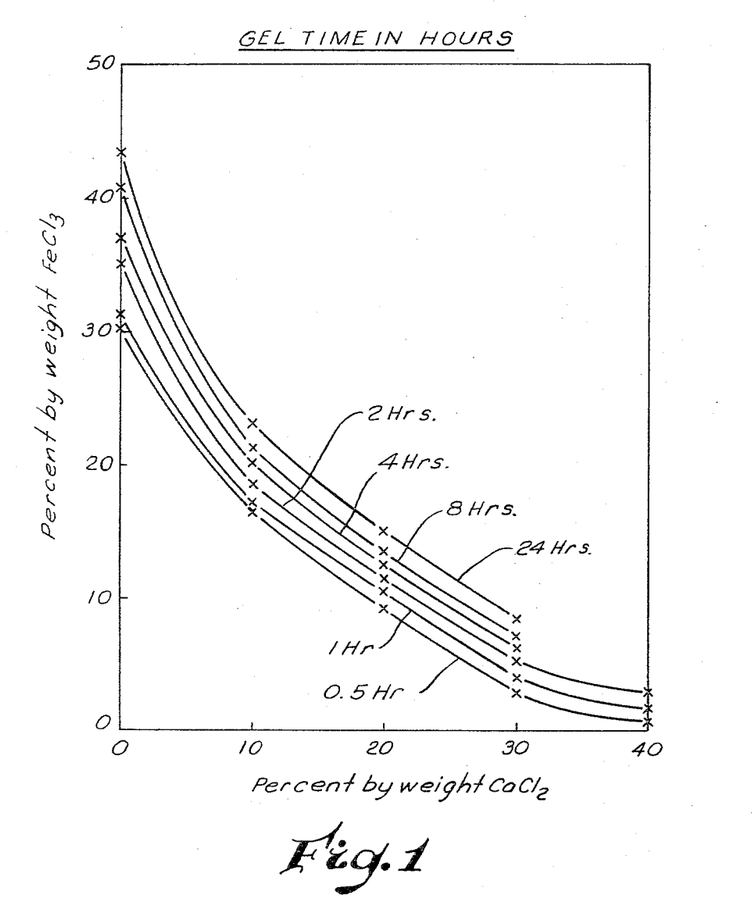

Reference to FIGURE 1 shows graphically that as both the $CaCl_2$ and the $FeCl_3$ are increased, within the solubilities of each in the aqueous solution, the gel time increases. It also shows that a preferred retarded gel is attained by employing a ratio of $CaCl_2$ to $FeCl_3$ of between about 40/1 or 40 and 1/40 or 0.025.

Series Two.—Tests 6 to 9

This series of tests was made to show the effect of polymer concentration on gel time. The polyacrylamide, cross-linked with 4600 parts per million of methylenebisacrylamide per million parts of acrylamide, as described above, was employed in amounts of from 0.5 to 4.0 pounds per gallon of an aqueous slurry which consisted of 30 percent by weight $CaCl_2$ and 4.2 percent $FeCl_3$, at 80° F. The results are shown in Table II below.

TABLE II.—GEL TIME OF VARIOUS POLYMER CONCENTRATIONS IN AQUEOUS SOLUTIONS OF 30% $CaCl_2$+4.2% $FeCl_3$, AT 80° F.

| Test No. | Pounds of Polymer per Gal. of Slurry | Gel Time in Minutes |
|---|---|---|
| 6 | 0.5 | 275 |
| 7 | 1.0 | 140 |
| 8 | 3.0 | 60 |
| 9 | 4.0 | 20 |

Reference to Table II shows that the greater the amount of polymer admixed with a given aqueous salt solution, the faster the gel. Reference to the table therefore suggests that, where the gel time is desired to be further delayed, a smaller amount of the polymer per gallon of the aqueous solution may be employed. For general use, however, higher amounts of polymer are preferred, e.g. 3 to 4 pounds per gallon, so long as the resulting dispersion is of a sufficiently low viscosity for easy pumping.

Series Three.—Tests 10 to 22

This series of tests was made to show the effect of employing $CaCl_2$ alone at two concentration levels; of employing various other inorganic salts with $CaCl_2$ in accordance with the practice of the invention; and employing other salts than $CaCl_2$ alone. The polymer concentration was 4 pounds per gallon of slurry. Significant results are tabulated in Table III.

TABLE III.—GEL TIME OF DISPERSION CONSISTING OF FOUR POUNDS OF POLYMER IN VARIOUS AQUEOUS SLURRIES AT DIFFERENT TEMPERATURES

| Test No. | Aqueous Salt Solution of Salts | | | | Gel Time in Hours at Stated Temperatures | | |
|---|---|---|---|---|---|---|---|
| | Salt #1 | Percent by Weight | Salt #2 | Percent by Weight | 80° F. | 120° F. | 150° F. |
| 10 | $CaCl_2$ | 20 | None | None | 2 min.[1] | 2 min. | 2 min. |
| 11 | $CaCl_2$ | 40 | do | do | 0.5 | 2 min. | 2 min. |
| 12 | $CaCl_2$ | 33.3 | $ZnCl_2$ | 16.6 | 2.5 | 0.5 | About 0.25. |
| 13 | $CaCl_2$ | 38.1 | $FeCl_3$ | 4.75 | 24 | 1 | 0.5. |
| 14 | $CaCl_2$ | 37.3 | $FeCl_3$ | 7.0 | 96 | 2 | 1. |
| 15 | $CaCl_2$ | 36.3 | $FeCl_3$ | 9.1 | 168 | 18 | 1.5. |
| 16 | $CaCl_2$ | 36.3 | $AlCl_3$ | 9.1 | 2.5 | 0.5 | About 0.25. |
| 17 | $ZnCl_2$ | 40 | None | None | 2 min | 2 min. | 2 min. |
| 18 | $FeCl_3$ | 40 | do | do | 9 | 1 | 0.5. |
| 19 | $ZnCl_2$ | 60 | do | do | 0.5 | About 0.25. | 0.25. |
| 20 | $AlCl_3 \cdot 6H_2O$ | 40 | do | do | 2 min | 2 min. | 2 min. |
| 21 | NaCl | 26 | do | do | 2 min | 2 min. | 2 min. |
| 22 | $SnCl_4$ | 40 | do | do | 2 min | 2 min. | 2 min. |

[1] For practical purposes those designated as gelling in less than 2 minutes gelled almost immediately.

Reference to Table III shows that when no more than 20 percent by weight of $CaCl_2$ is employed alone in preparing the aqueous salt solution, the polymer gels too fast at 80° F. to permit emplacement as needed. When the polymer is admixed with a 40 percent $CaCl_2$ aqueous solution, however, the rate of gelation is retarded, requiring 0.5 hous at 80° F. (a common prevalent ambient atmospheric temperature). This is sufficient time for emplacing the fluid composition prior to gel for a number of uses.

Reference to Table III also shows that when the polymer is admixed with various aqueous solutions of mixtures of $CaCl_2$ and other metal salts, e.g. $ZnCl_2$, $FeCl_3$, or $AlCl_3$, fully satisfactory gelled compositions are produced for use at a temperature of either about 80° F. or about 120° F. and that when $CaCl_2$ and either $AlCl_3$ or $FeCl_3$ mixed solutions are employed in the amounts shown, a fully satisfactory gelation of the polymers is effected at about 150° F. as well. It further shows that $FeCl_3$ alone is fully satisfactory for relatively fast gels, e.g. 0.5 hour, and that a 40 percent aqueous solution thereof gives a longer gel time when such is desired. It also shows that a 40 percent by weight aqueous solution of $ZnCl_2$ alone is unsatisfactory at 80° F. but that a 60 percent by weight solution thereof is satisfactory to give a relatively fast gel at 80° F.

Series Four.—Tests 23 to 48

This series of tests was made to show the effectiveness of an aqueous solution of $FeCl_3$ at two levels of concentration and the effectiveness of $FeCl_3$ (maintained at a given level of concentration) to which has been admixed an additional salt, in an amount of 5 percent by weight of the resulting aqueous solution, on the gel time of a slurry containing 4 pounds of the methylene-bisacrylamide cross-linked acrylamide polymer per gallon, at 80° F. The results of this series are tabulated in Table IV.

TABLE IV.—THE EFFECTIVENESS OF $FeCl_3$ AQUEOUS SOLUTIONS AND SUCH SOLUTIONS CONTAINING 5 PERCENT BY WEIGHT OF VARIOUS OTHER SALTS ON THE GEL TIME OF 4 POUNDS OF POLYMER PER GALLON OF SLURRY

| Test No. | Aqueous Salt Solution | Gel Time in Minutes |
|---|---|---|
| 23 | 30% $FeCl_3$ | 105 |
| 24 | 30%+5% $FeCl_3$ (i.e. 35% $FeCl_3$) | 360 |

All following tests were made employing an aqueous solution of 30% $FeCl_3$+5% of each of the salts indicated below:

A

| Test No. | Aqueous Salt Solution | Gel Time in Minutes |
|---|---|---|
| 25 | $AlCl_3$ | 1,020 |
| 26 | $CaCl_2$ | 360 |
| 27 | $Co(NO_3)_2$ | 495 |
| 28 | $MgCl_2$ | 840 |
| 29 | $MnSO_4$ | 660 |
| 30 | $NiCl_2$ | 420 |
| 31 | $SnCl_2$ | 420 |
| 32 | $TiCl_4$ | 840 |
| 33 | $TiCl_3$ | over 1,200 |

B

| Test No. | Aqueous Salt Solution | Gel Time in Minutes |
|---|---|---|
| 34 | $BaCl_2$ | 130 |
| 35 | $NH_4Cl$ | 113 |
| 36 | $BiCl_3$ | 150 |
| 37 | $CuCl_2$ | 113 |
| 38 | $CrCl_3$ | 155 |
| 39 | $CdCl_2$ | 130 |
| 40 | $FeCl_2$ | 330 |
| 41 | KCl | 120 |
| 42 | $SnCl_4$ | 300 |
| 43 | $ZnCl_2$ | 180 |

C

| Test No. | Aqueous Salt Solution | Gel Time in Minutes |
|---|---|---|
| 44 | $SbCl_3$ | 15 |
| 45 | $Ce_2(SO_4)_3$ | 37 |
| 46 | $LiNO_3$ | 105 |
| 47 | $Sr(NO_3)_2$ | 105 |
| 48 | $ZrCl_4$ | 105 |

The tests tabulated in Table IV illustrate that when the polymer is admixed with a 30 percent by weight aqueous solution of $FeCl_3$, a fully satisfactory gel results at 80° F. However, it is clearly shown that, if a longer gel is desired, additional $FeCl_3$ may be used in preparing the aqueous solution. The tests of section A demonstrate that the addition of 5 percent of any $CaCl_2$, $CO(NO_3)_2$, $MgCl_2$, $MnSO_4$, $NiCl_2$, $SnCl_2$, $TiCl_4$ or $TiCl_3$ results in a gel of a desirable extended length of time, at 80° F. In section B of Table IV, wherein 5 percent of such salts as $BaCl_2$, $NH_4Cl$, $BiCl_3$ or others named are admixed with 30 percent $FeCl_3$ to prepare the aqueous solution, a faster gel results at 80° F., but one, however, which is quite desirable under a number of operating conditions. In section C of Table IV, a substantially unchanged gel period is shown to result when 5 percent of such salts as $SbCl_3$ or $Ce_2(SO_4)_3$ or others therein listed are employed with 30 percent $FeCl_3$ in preparing the aqueous solution to which the polymer is subsequently added.

It is clear from a study of the results shown in Table IV that a judicious selection of salts will result in a combination which will meet a very wide set of conditions. Also, it demonstrates that some salts are more effective than others. From these and other tests made it is clear that lower temperatures than 80° F. will result in a longer gel time and higher temperatures than 80° F. will result in a shorter gel time. It is also clear from these and other tests that combinations of two or more salts may be employed to prepare the aqueous solution with which the polymer is admixed to attain desirable gel periods.

When strongly acidic materials, as mineral acids or acid anhydrides are employed in the aqueous solution, the polymer shows a tendency to degrade or deteriorate. Accordingly such acidic materials are not recommended in the practice of the invention.

Series Five.—Tests 49 to 60

This series of tests was conducted to show the effect of selecting metallic salts having other than halide anions. The tests are comparable to those set out in Series Four but differ to the extent that $FeCl_3$ was replaced by $Fe_2(SO_4)_3$ and that $CaCl_2$ was replaced by $Ca(NO_3)_2$. The results are set out in Table V.

TABLE V.—THE EFFECT ON THE GELLING TIME OF 4 POUNDS OF POLYMER ADMIXED WITH AQUEOUS SOLUTIONS OF NITRATES OR SULFATES OF VARYING CONCENTRATIONS AT 80° F.

| Test No. | Aqueous Salt Solution | Gel Time in Minutes |
|---|---|---|
| A | | |
| 49 | 55% $Ca(NO_3)_2$ | 8 |
| 50 | 60% $Ca(NO_3)_2$ | 30 |

In the following tests, 5% of the salts indicated below were employed in addition to 55% of $Ca(NO_3)_2$:

| | | |
|---|---|---|
| 51 | $Fe(NO_3)_3$ | 24 |
| 52 | $Cu(NO_3)_2$ | 16 |
| 53 | $Co(NO_3)_2$ | 20 |
| 54 | $Cd(NO_3)_2$ | 25 |
| 55 | $Al(NO_3)_3$ | 12 |
| 56 | $Pb(NO_3)_2$ | 10 |
| B | | |
| 57 | 32% $Fe_2(SO_4)_3$ | 2 |
| 58 | 42% $Fe_2(SO_4)_3$ | 105 |

In the tests below 10% of the salts listed were added to a 32% $Fe_2(SO_4)_3$ aqueous solution:

| | | |
|---|---|---|
| 59 | $MgSO_4$ | 120 |
| 60 | $Al_2(SO_4)_3$ | 210 |

Reference to Table V shows that salts and mixtures of salts other than the halides are operable at 80° F. It shows that a mixture of $Fe_2(SO_4)_3$ with $MgSO_4$ or with $Al_3(SO_4)_2$ in the amounts shown are quite satisfactory where a delayed gel time is desired. As has been previously shown, temperature affects the gelation rate; therefore many of the above could provide desirably delayed gel times at less than 80° F.

Series Six.—Tests 61 to 67

This series of tests was made to show the significance of the aqueous tension value of designated salt solutions, at a convenient operating temperature, and the gel time resulting when a 4 pound per gallon slurry of the polymer with the aqueous salt solution was made. The results are shown in Table VI.

TABLE VI.—AQUEOUS TENSION OF VARIOUS AQUEOUS SALT SOLUTIONS AT 75° F. AND THE GEL TIMES OF 4 POUNDS OF POLYACRYLAMIDE PER GALLON OF THE AQUEOUS SLURRY AT 80° F.

| Test No. | Aqueous Salt Solution | Temperature in °F. | Aqueous Tension in Millimeters of Mercury | Gel Time |
|---|---|---|---|---|
| 61 | 40% $CaCl_2$ | 75 | 9.5 | 30 min. |
| 62 | 66% $KC_2H_3O_2$ | 75 | 9.5 | 28 min. |
| 63 | 73% $KC_2H_3O_2$ | 75 | 5.5 | 4 hrs. |
| 64 | Saturated KF | 75 | 6 | 3 days. |
| 65 | Saturated NaCl | 75 | 17 | 2 min. |
| 66 | Saturated NaCl | 45 | 7 | 15 min. |
| 67 | 50% NaOH | 75 | About 2 | (Had not gelled after 7 days.)[1] |

[1] This aqueous dispersion of polymer gelled satisfactorily in 2 hours at 150° F.

Reference to Series Six and the results thereof shown in Table VI show the relationship between aqueous tension and gel time. It will be noted that the lower aqueous tension values result in a longer gel time when other conditions are held substantially constant, and contrariwise, the higher aqueous tension solutions result in a much faster gel time. It can be reasonably concluded from a study of Table VI that an aqueous solution having an aqueous tension of about 10 millimeters of mercury or less is desirable to give a sufficient time for properly applying, injecting, or otherwise emplacing the gelable liquid composition. When the polymer is essentially nonhydrolyzed with the more highly hydrolyzed polymers the aqueous tension values can be increased to about 20 millimeters of mercury as previously discussed. However, the general observations concerning gel time versus aqueous tension values are applicable. It also shows that the actual concentrations employed in Tests 61 to 64 are quite satisfactory when the invention is carried out at about 75° F. Unless an advanced temperature were to be employed, the practice according to Test 67 would normally not be recommended. However, the greatly extended gelling time could be useful in specialized applications.

Series Seven.—Tests 68 to 71

This series of tests was made to show the capacity of the already gelled polymer solid to imbibe additional aqueous solution. The tests were conducted by placing 100 cubic centimeters of gelled polymer in a beaker and adding thereto 300 milliliters of water. After the times recorded in Table VII below, any remaining free water was decanted and its volume measured.

TABLE VII.—THE CAPACITY OF THE GELLED POLYMER OF THE INVENTION TO IMBIBE WATER IN CONTACT THEREWITH

| Test No. | Aqueous Solution Employed to Gel the Polymer | Milliliters of Free Water Remaining After the Designated Period, at 80° F. | | | | |
|---|---|---|---|---|---|---|
| | | 1 Hr. | 4 Hr. | 7 Hr. | 48 Hr. | 72 Hr. |
| 68 | 40% $CaCl_2$ | 260 | 230 | 207 | 80 | 38 |
| 69 | 33% $CaCl_2$ plus 17% $ZnC_2$ | 252 | 218 | 187 | 0 | 0 |
| 70 | 36% $CaCl_2$ plus 9% $AlCl_3$ | 245 | 200 | 154 | 0 | 0 |
| 71 | 38% $CaCl_2$ plus 4.8% $FeCl_3$ | 252 | 227 | 212 | 110 | 80 |

Reference to Series Seven and the results thereof as shown in Table VII show that the already gelled polymer continues to imbibe water in contact therewith and to swell to a very marked extent. In all instances the original 100 cubic centimeters of gelled polymer solid swelled to about 1.5 times its original volume in 1 hour when in contact with sufficient water and thereafter continued to imbibe water and to swell throughout the duration of the test. In Tests 68 and 69, all of the water was imbibed between 7 and 48 hours and it is reasonable to assume that additional water would have been imbibed had it been present. However, the rate of swelling (imbibition) lessens perceptively as time passes showing that a state of equilibrium is being approached. The gelled polymer, after imbibing the additional water, remained solid and well integrated showing that its sealing capacity continued to be effective.

*Series Eight.—Tests 72 to 73*

This series of tests was run to show the resistance to indentation and penetration of the composition of matter formed when the acrylamide polymer was admixed with solutions of varying concentrations of $FeCl_3$ and $CaCl_2$ in accordance with one embodiment of the practice of the invention. The polymer was employed in an amount of 4 pounds per gallon of each of the slurries. Four samples of the resulting gelled polymer composition were taken. Two were placed in a container (to exclude access thereto of any appreciable amount of air) for later testing. The other two samples were tested within about two hours. One was tested by employing the penetrometer in the procedures of the Cone Penetration Test, ASTM D-217-60. (ASTM Standards 1961, part 7, pages 109 to 212.) This test is conducted by employing the penetrometer there illustrated to show the resistance to penetration of the standard cone forming part of the apparatus. The results are recorded as the extent of penetration of the cone in tenths of a millimeter.

The second sample was tested according to the procedure of the Indentation Test ASTM D-676-59T, as described in ASTM Standards 1961, part 11, pages 291 to 294, employing a hand durometer of the nature of that illustrated on the left of FIGURE 5 on page 293. The durometer is provided with an arcuate-shaped dial, calibrated in divisions designated from 0 to 100. The higher the reading obtained when testing a substance, the harder the substance tested. (The hardness of plate glass registers 100 on the dial.) The two samples which had been placed in the container were also tested by the penetrometer and the durometer after about one week in storage. No detectable difference was shown in the properties of the samples due to the week of storage, i.e. the freshly gelled samples showed the same test values as those of about a week old. Visual observation of the samples showed them to have a consistency quite similar to a standard art gum eraser, except that the gelled composition was more resistant to tear and shear. The composition of the aqueous solutions employed and the results of the tests are set out in Table VIII.

TABLE VIII.—PROPERTIES OF THE GELLED POLYMER COMPOSITION CONTAINING 4 LBS. OF POLYMER PER GALLON OF SLURRY ACCORDING TO STANDARD TESTS

| Test No. | Aqueous Salt Solution Employed | Penetrometer Test According to the Penetrometer of ASTM D-217-60 | Durometer Test According to ASTM D-676-59T |
|---|---|---|---|
| 72 | 40% $CaCl_2$ | 60-72 | <10 |
| 73 | 40% $CaCl_2$ plus 5.7% $FeCl_3$ | 22 | 18 |

Reference to Table XIII shows that the composition formed, although resilient, has adequate resistance to penetration and is sufficiently strong to have wide application where a resilient and durable composition is desired. As demonstrated by Table VIII, the composition of the salt solution affects the physical characteristics of the composition formed. Additionally, the amount of polymer employed will affect the values of resistance to penetration and resilience. When polymer concentrations of about 1 lb. per gallon are employed, the resistance to penetration will decrease to a value of about 200 and the durometer value to about 2. The samples stored in the container simulates the conditions of actual use in sealing. The fact that the stored samples were unchanged by time shows that the polymer composition of the invention will continue to provide a good seal over a desirable period of time.

The complete mechanism involved when the acrylamide polymer is dispersed in the aqueous solution of inorganic hydroxide or salt as aforesaid, is not fully understood.

Although, as has been shown, salts of various monovalent, divalent, and trivalent or higher valent metals in solution perform satisfactorily in the practice of the invention, superb results are obtained by employing an aqueous solution consisting of salts of different valences. For example, excellent control of the gel rate may be maintained by selecting the proportion of a mono- or divalent metal or ammonium salt and a multivalent (3 or more positive valent) salt. For example, a slurry containing 4 lbs. per gallon polymer in an aqueous salt solution consisting of 38.1% $CaCl_2$ and 4.7% $FeCl_3$ gels in about 4 hours but a solution consisting of 37.2% $CaCl_2$ and 7.0% $FeCl_3$ gels the same amount of the polymer in 96 hours. Similar results may be obtained by replacing $CaCl_2$ with other divalent metal water-soluble salt and by replacing the $FeCl_3$ with other tri- or higher valent salt.

Aqueous solutions of two or more salts of metals of different valences accordingly have clearly shown a synergistic effect on the retardation of the gel time and produce a stronger resulting gel composition. Such salts, in combination, are $CaCl_2$ or $MgCl_2$ and $FeCl_3$, and such naturally occurring complex sulfates as the alums having the generic formula $M'_2SO_4 \cdot M''_2(SO_4)_3 \cdot 24H_2O$, wherein M' is a positive monovalent component, e.g. Na, K, Rb, Cs, $NH_4$, or Li, and M" is a multivalent positive component, e.g. Fe, Al, Cr, Mn, Rh, Ti, or V.

There are undoubtedly a large number of interrelated intricate forces set into operation, likely including hydration, cross-linking through metallic hydrous oxides, rearrangement and growth of polymer molecules, osmosis of aqueous solution into the polymer molecules manifested by turgidity, which in combination ultimately result in a tough uniformly fine-textured matrix which retains the capacity to imbibe additional water or brine solutions commonly encountered. However, although the chain of events which are set in operation by admixing the polymer with the aqueous hydroxide or salt solution, are intricate, we have discovered that the aqueous tension (i.e. vapor pressure of an aqueous solution) of the solution employed is a function of the combined effect of the more subtle phenomena associated with the gelling of the polymer.

Accordingly, the aqueous tension of the aqueous solution employed is a reliable and valid test for an acceptable aqueous solution to use in the practice of the invention. Procedures for ascertaining vapor pressure values of aqueous solutions are well known. More advanced manuals relating to physical constants in general discuss the subject. Particularly suitable procedures may be found in Industrial and Engineering Chemistry, Analytical Edition, vol. 18 (1946), page 234 et seq. by Daniel R. Stull and in Journal of Research for the National Bureau of Standards, vol. 35 (1945), page 219 et seq. by C. B. Willingham, W. J. Tayler, J. M. Pignocco, and F. D. Rossini. Additional information on the effect of specific inorganic salts in the aqueous tension may be found in International Critical Tables, e.g. vol. III, pages 292 to 299 and 365 to 375.

The gelled polymer composition of the invention remains resilient and resistant to movement by pressures when confined underground or in conduits where loss of water therefrom is very small. It resists degradation by chemical attack including that of strong acidic solutions. It has a uniform fine texture, showing no graininess, objectionable voids, or tendency to form striations during gelation or to foliate after gel. The gelled polymer composition may be dried to form a tough and strong material having desirable characteristics for underlays, thermal insulation and the like where either no appreciable amount of water contacts it or where the swelling which results from contact with water is not objectionable, or may even be useful.

The following example illustrates the method of sealing passageways in accordance with the invention.

FIELD EXAMPLE 1

A 2-inch steel pipe 30 feet in length, open at both ends, was desired to be closed against the passage of water or brine (containing substantial amounts of dissolved NaCl plus lesser amounts of $CaCl_2$, $MgCl_2$ and traces of other water-soluble salts).

An aqueous solution consisting, by weight, of 38.1% $CaCl_2$ and 4.7% $FeCl_3$ dissolved in water was prepared. The cross-linked polymer was prepared by polymerizing acrylamide with 4600 parts of N,N'-methylenebisacrylamide per million parts of acrylamide, in the presence of a redox catalyst system comprised of sodium thiosulfate and potassium bisulfate. The polymer had a molecular weight of about 1,000,000 and was about 4% to 5% hydrolyzed. The polymer was drum-dried and ground to a particle size of between about 20 mesh and 325 mesh. The powdered polymer was admixed with the aqueous salt solution to produce an amount of 4 pounds per gallon of slurry, at about 75° F. The density of the polymer dispersion was about 1.438 kgm./liter. The resulting dispersion was promptly pumped into the 2-inch pipe until it was substantially filled. After 96 hours the polymer was found to be completely gelled. An attempt was made to force water around the polymer gel or to dislodge the polymer from the pipe by forcing it out by means of hydraulic pressure. Pressure was applied at one end of the pipe up to 3000 p.s.i.g. (pounds per square inch gauge) without observing any leakage of fluid or movement of the polymer at the opposite end of the pipe. This was the maximum safe pressure allowed for the pipe. The gelled polymer was not adhered to the steel pipe. However, after disconnecting the pump, the polymer was easily pulled from the pipe due to its capacity to elongate under tension. The gelled polymer was removed as an unbroken 2-inch diameter, 30 foot length. It had a uniform fine texture. It was extremely tough and could be cut only with difficulty and could not be pulled or torn apart by hand by the combined efforts of the men conducting the operation.

FIELD EXAMPLE 2

Figure 2:
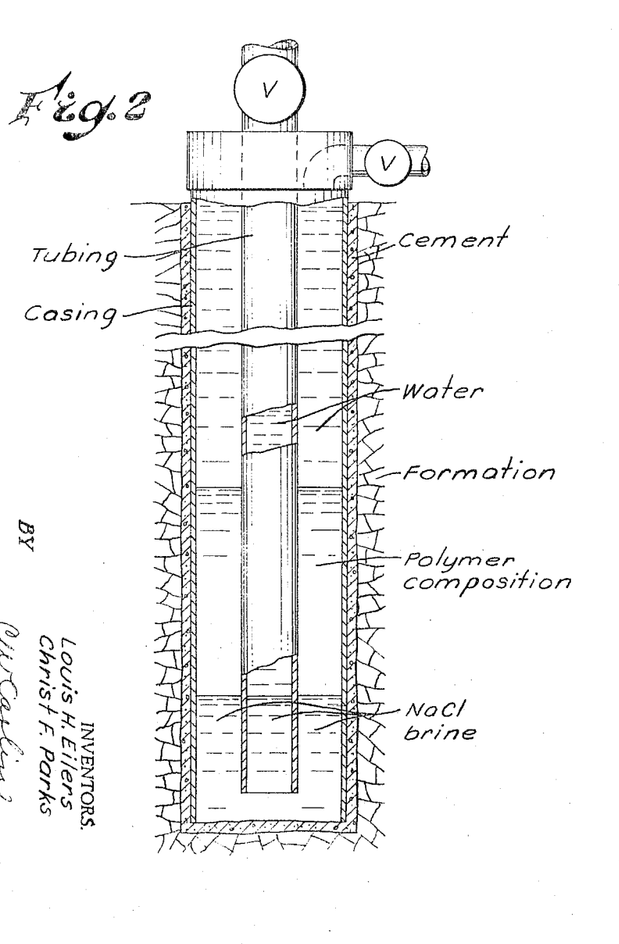

Reference to FIGURE 2 of the drawing, in relation to the procedure followed in this example, will be helpful.

A seal was desired to be positioned in the annulus between a 5.5-inch casing of a well penetrating a subterranean formation and a 2-inch tubing (about seven feet off bottom and substantially centrally positioned). The casing was cemented to the formation and was plugged off at the bottom employing Class A neat cement, according to conventional practice. The well was treated as follows: about 20 gallons of NaCl brine (of about 10 pounds gallon density) was poured down the tubing, a part of which rose in the annulus, filling the tubing and annulus to a level of about 20 feet from the bottom. An aqueous dispersion of polymer of the type employed in Field Example 1 above was prepared except that the proportions of $CaCl_2$ and $FeCl_3$ employed were 33% $CaCl_2$ and 5% $FeCl_3$ by weight of the aqueous solution to which the polymer was added. The ambient temperature during mixing was about 80° F.; the formation temperature was about 65° F. The dispersion so made was promptly poured down the annulus between tubing and casing in an amount of about 20 gallons which located the dispersion between the levels of about 20 and 45 feet, in the annulus, from the bottom. Water was then placed down the tubing and down the annulus on top of the polymer dispersion until both tubing and annulus were filled to ground level. FIGURE 2 shows the well at this stage of treatment. The well was then closed in for 24 hours during which the polymer composition gelled. The well was then opened and examined. The seal provided in the annulus by the gelled polymer composition was then tested by applying pressures up to 2000, 4000, and 6000 p.s.i.g. on the tubing. After each of the pressures stated, the pressure was maintained until the full effect on the polymer seal was exerted. The seal provided by the gelled polymer composition could not be dislocated at those pressure, nor was any leakage around the seal noted.

FIELD EXAMPLE 3

Figure 3:
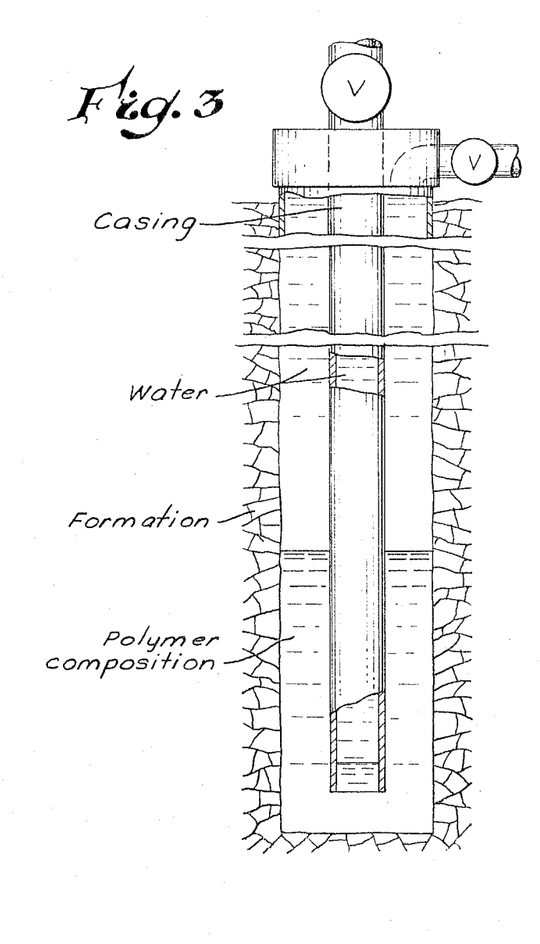

Reference to FIGURE 3 of the drawing in relation to the procedure followed in this example will be helpful.

An uncased well penetrating a subterranean formation was to be provided with a casing of considerably less diameter than that of the hole. The casing was lowered into position and suspended, centrally positioned, about 4 feet off bottom. It was desired to seal the annulus between the casing and the borehole wall of the well. An aqueous polymer dispersion was prepared similarly to that used in Field Example 2 immediately above except the concentration of $FeCl_3$ was greater to insure a longer gel time. The aqueous solution employed was 33% $CaCl_2$ and 7.5% $FeCl_3$ by weight of the aqueous solution. The ambient temperature during mixing was about 83° F. and the formation temperature was about 65° F. About 16 gallons of the polymer dispersion so made were poured down the casing and then displaced up into the annulus by pumping 0.5 gal. of 35% CaCl₂ followed by 2.5 gal. of dilute brine down the casing. The polymer dispersion located by this procedure filled the 4 feet of well bore up to the casing and the annulus between about 4 feet and 16 feet from bottom. The remaining space in the annulus and casing were then filled with water. FIGURE 3 shows the well at this stage of treatment. The well was closed in for 40 hours during which the polymer composition gelled. The well was then opened and pressure applied to the casing. At 600 p.s.i.g., water began to trickle from the annulus at ground level. As pumping continued, the pressure fell off to about 200 p.s.i.g. and water continued to trickle from the annulus. Pressurizing the casing was discontinued for 10 minutes and then resumed. The pressure rose to 275 p.s.i.g. without leakage, whereupon water again began to trickle from the annulus and the pressure to drop. Pressurizing was discontinued for 1.5 hours. Thereafter pressuring was resumed. The pressure rose to 500 p.s.i.g. and then dropped back to 200 p.s.i.g. (although water was not coming from the annulus at ground level at any time during this pressurizing). The pressure remained substantially at this value until pumping was discontinued. It is apparent that the pressure necessary to initiate a fracture in the formation was about 500 p.s.i.g. At this pressure, water pumped down the casing broke on into the formation. The pressure required to further extend the fracture was about 200 p.s.i. It is apparent that the strength and resistance of the gelled polymer composition to leakage exceeded that which the formation was capable of withstanding, without fracturing. The ability of the gelled polymer composition to reseal is also demonstrated in this test.

Examples 1 to 3, immediately above, demonstrate conclusively that the method of sealing or plugging, according to the invention, employing the composition of the invention provides:

(1) A tight seal or plug in tubes, pipes, and conduits that will withstand very high pressures without permitting passage of gas or liquid, as shown in Field Example 1.

(2) A tight seal in the annulus in concentric pipes, e.g. tubing and casing of a well, that will withstand very high pressures without permitting passage of gas or liquid, as shown in Field Example 2.

(3) A tight seal between a pipe and a formation wall, e.g. a well casing and the wall of a subterranean formation, that will withstand pressures applied thereto until the formation pressure is exceeded, thereby insuring a satisfactory seal against water or gas seepage between the formation wall and a shaft liner, well casing, or tunnel wall, as shown in Field Example 3 above, so that personnel, equipment, materials, supplies employed or fluids stored underground (the safety and protection of which are dependent upon the absence of such seepage) will be relieved of dangers and damages resulting therefrom.

The gelable compositions and this method of accomplishing liquid tight sealing off of passageways, channels, pipes and the like may be used advantageously in combination with the method of obtaining improved bonding between a Portland cement set to a unitary solid and the surfaces which contain and confine the set cement in co-pending application Serial No. 371,755 entitled, "Method of Cementing Wells and Shafts," filed concurrently herewith by Robert C. Martin.

Briefly the cement described and claimed in said application attains improved bonding by its capacity to expand during the setting period as described therein. It consists essentially of an aqueous slurry of an hydraulic cement consisting of 100 parts of Portland cement and between about 5 and 95 parts of finely subdivided calcium sulfoaluminate clinker which, when ignited, to the oxides consists essentially of about 4 moles of CaO, 3 moles of $Al_2O_3$, and 1 mole of $SO_3$, and adequate water for a pumpable slurry, as set out more completely in said application on page 8 thereof.

In a combined use of the two sealing methods the brine slurry of the gelable polymer and a slurry of expansive cement may be used to effect a double seal in the area being sealed off. For example, when cementing casings in wells, in accordance with this invention, the gelable slurry and the cement slurry may advantageously be hydraulically pumped into place simultaneously, one slurry following immediately upon the other, to produce adjacent sealing bodies. An especial advantage in accordance with this invention is the cooperating expansiveness of the two sealing materials; the expansive Portland cement improves the sealing bond to adjacent surfaces by expanding during the first days of emplacement. Any adjacent sealing material must be capable of withstanding movement in boundary materials without breaking seal, and must be able to compensate for any enlarging of the area being sealed by undergoing similar enlargement. The gelable polymer slurries heretofore described possess these qualities. Being pliable in nature, they will move with movement of boundary materials. Encroaching water will cause immediate swelling, as shown by Table VII and the ensuring discussion, and sealing-off to prevent passage of such water.

Having described our invention, what we claim and desire to protect by Letters Patent is:

1. A fluid, gelable composition prepared by reacting an intimate mixture of: component (A) an anhydrous particulated acrylamide polymer selected from the class consisting of (1) linear and cross-linked polymerized acrylamide, (2) copolymers prepared by polymerizing at least about 90 percent by weight acrylamide and balance an ethylenically unsaturated monomer copolymerizable therewith, to make a water-dispersible copolymer, selected from the class consisting of acrylic acid, methacrylic acid, vinylsulfonic acid, vinylbenzyltrimethylammonium chloride, vinylbenzylsulfonic acid, vinylbenzenesulfonic acid, and alkali and alkaline earth metal salts of said acids, and (3) mixtures of (1) and (2) and component (B) an aqueous solution of an inorganic compound selected from the class consisting of inorganic water-soluble hydroxides and salts in an amount sufficient to reduce the aqueous tension of pure water to a positive final aqueous tension value at the temperature employed, which is between the freezing point and the boiling point of said solution, of not greater than about 10 millimeters of mercury, wherein the linear and cross-linked polyacrylamide polymer and copolymer is about 90% unhydrolyzed and to not greater than about 20 millimeters of mercury in polyvalent cation solutions where the polyacrylamide is about 60% unhydrolyzed, and not in excess of the amount of the inorganic compound necessary to saturate the water at the temperature employed, component A being employed in an amount of between about 0.5 and about 5.0 pounds per gallon of total slurry.

2. The composition prepared according to claim 1 wherein the polymer employed is a cross-linked acrylamide polymer prepared by reacting acrylamide and between about 500 and 5000 parts of an N,N'-alkylidene bisacrylamide per million parts by weight of acrylamide in the monomeric mix.

3. The composition prepared according to claim 2 wherein the N,N'-alkylidene bisacrylamide is N,N'-methylenebisacrylamide employed in an amount of between about 2500 and 5000 parts per million parts of acrylamide in the monomeric mix.

4. The composition prepared according to claim 1 wherein the polymer is employed in an amount of between about 2 and 4 pounds per gallon of said aqueous slurry at a temperature between the freezing point and boiling point of the aqueous solution.

5. The composition prepared according to claim 1 wherein said B component is an aqueous solution of at least one inorganic compound selected from the class consisting of NaOH, KOH, $CaCl_2$, $MgCl_2$, $SrCl_2$, $FeCl_3$, $ZnCl_2$, LiCl, $TiCl_4$, $SnCl_4$, KF, NaI, NaBr, $Mg(NO_3)_2$, $Fe(NO_3)_3$, $Ca(NO_3)_2$, $Zn(NO_3)_2$, $K_2CO_3$, $KC_2H_3O_2$, $Fe_2(SO_4)_3$, $CuSO_4$, mixtures of said compounds with $NH_4Cl$, KCl, KBr, and $LiNO_3$; and complex sulfates and hydrates of said compounds, and mixtures of said compounds and hydrates.

6. The composition prepared according to claim 1 wherein component B is an aqueous solution of $CaCl_2$ and $FeCl_3$.

7. The composition prepared according to claim 6 wherein the ratio of $CaCl_2$ to $FeCl_3$ present is between about 40 and .025.

8. The composition prepared according to claim 1 wherein component B is an aqueous solution of $Ca(NO_3)_2$ and $Fe(NO_3)_3$.

9. The composition prepared according to claim 1 wherein component B is an aqueous solution of $Mg(NO_3)_2$ and $Fe(NO_3)_3$.

10. The composition prepared according to claim 1 wherein component B is an aqueous solution of $CaCl_2$ and $AlCl_3$.

11. The composition prepared according to claim 1 wherein component B is an aqueous solution of $CaCl_2$ and $ZnCl_2$.

12. The composition prepared according to claim 1 wherein the complex sulfate salt is an alum having the generic formula $M'_2SO_4, M''_2(SO_4)_3 \cdot 24H_2O$, wherein M' is selected from the class consisting of Na, K, Rb, Cs, $NH_4$, and Li and M'' is selected from the class consisting of Fe, Al, Cr, Mn, Rh, Ti, and V.

13. The composition prepared according to claim 1 wherein component B is an aqueous solution of $Ca(NO_3)_2$ and $Zn(NO_3)_2$.

14. The resilient, durable, gelled solid composition formed when the fluid composition prepared according to claim 1 is allowed to stand at a temperature between the freezing point and boiling point of said component B for from about 0.25 hour to about 168 hours and having a resistance to penetration according to the penetrometer of ASTM D-217-60 to provide a penetrometer value of between about 200 and about 15 and a durometer value according to ASTM D-676-59T of between about 2 and about 20.

15. The resilient, durable, gelled solid composition formed when the fluid composition prepared according to claim 1 is allowed to stand at a temperature between the freezing point and boiling point of said component B for from about 0.25 hour to about 168 hours and having a resistance to penetration according to the penetrometer of ASTM D-217-60 to provide a penetrometer value of between about 70 and about 20 and a durometer value according to ASTM D-676-59T of between about 10 and about 18.

16. The resilient, durable, gelled solid composition formed when the fluid composition prepared according to claim 2 is allowed to stand at a temperature between the freezing point and boiling point of said component B for from about 0.25 hour to about 168 hours and having a resistance to penetration according to the penetrometer of ASTM D-217-60 to provide a penetrometer value of not more than about 72 and a durometer value according to the ASTM D-676-59T of not less than about 10.

17. The resilient, durable, gelled solid composition formed when the fluid composition prepared according to claim 5 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to the ASTM D-676-59T of not less than about 10.

18. The resilient, durable, gelled solid composition formed when the fluid composition prepared according to claim 6 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to ASTM D-676-59T of not less than about 10.

19. The resilient, durable, gelled solid composition formed when the fluid composition prepared according to claim 7 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to ASTM D-676-59T of not less than about 10.

20. The resilient, durable, gelled solid composition formed when the fluid composition prepared according to claim 8 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to ASTM D-676-59T of not less than about 10.

21. The resilient, durable, gelled solid composition formed when the fluid composition prepared according to claim 9 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to ASTM D-676-59T of not less than about 10.

22. The resilient, durable, gelled solid composition formed when the fluid composition prepared according to claim 10 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to ASTM D-676-59T of not less than about 10.

23. The resilient, durable, gelled solid composition formed when the fluid composition prepared according to claim 11 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to ASTM D-676-59T of not less than about 10.

24. The resilient, durable, gelled solid composition formed when the fluid composition prepared according to claim 12 is allowed to stand at a temperature between the freezing point and boiling point of said component B for from about 0.25 hour to about 168 hours and has a resistance to penetration according to the penetrometer of ASTM D-217-60 to provide a test reading of not more than about 72 and a durometer value according to ASTM D-676-59T of not less than about 10.

25. The method of sealing off openings which comprises emplacing into the opening a composition consisting essentially of: component (A) an anhydrous particulated acrylamide polymer selected from the class consisting of (1) linear and cross-linked polymerized acrylamide, (2) copolymers prepared by polymerizing at least 90 percent by weight acrylamide and balance an ethylenically unsaturated monomer copolymerizable therewith, to make a water-dispersible copolymer, selected from the class consisting of acrylic acid, methacrylic acid, vinylsulfonic acid, vinylbenzyltrimethylammonium chloride, vinylbenzylsulfonic acid, vinylbenzenesulfonic acid, and alkali and alkaline earth metal salts of said acids, and (3) mixtures of (1) and (2) and component (B) an aqueous solution of an inorganic compound selected from the class consisting of inorganic water-soluble hydroxides and salts in an amount sufficient to reduce the aqueous tension of pure water to a positive final aqueous tension value at the temperature employed of not greater than about 10 millimeters of mercury, where the linear and cross-linked polyacrylamide polymer and copolymer is about 90% unhydrolyzed and to not greater than about 20 millimeters of mercury in polyvalent cation solutions where the polyacrylamide is about 60% unhydrolyzed, and not in excess of the amount of the compound necessary to saturate the water at said temperature, component A being employed in an amount of between about 0.5 and about 5.0 pounds per gallon of total slurry at a temperature between the freezing point and the boiling point of component B and allowing the fluid composition so emplaced to stand within said temperature range until the fluid composition gels to a resilient fluid-tight solid.

26. The method according to claim 25 wherein the polymer is a cross-linked acrylamide polymer prepared by reacting acrylamide and between about 500 to 5000 parts of an N,N'-alkylidine bisacrylamide per million parts by weight of acrylamide in the monomeric mix.

27. The method according to claim 25 wherein the polymer is that prepared by polymerizing acrylamide with between about 500 and 5000 parts of an N,N'-alkylidene bisacrylamide per million parts by weight of acrylamide in the monomeric mix.

28. The method according to claim 27 wherein the N,N'-alkylidene bisacrylamide is N,N'-methylene bisacrylamide employed in an amount of between 2500 and 5000 parts per million parts of acrylamide in the monomeric mix.

29. The method according to claim 25 wherein the polymer employed is an amount of between about 2 and 4 pounds per gallon of said aqueous slurry at a temperature between the freezing point and boiling point of the aqueous solution.

30. The method according to claim 25 wherein component B is of the fluid composition employed is an aqueous solution of at least one inorganic compound selected from the class consisting of NaOH, KOH, $CaCl_2$, $MgCl_2$, $SrCl_2$, $FeCl_3$, $ZnCl_2$, LiCl, $TiCl_4$, $SnCl_4$, KF, NaI, KI, NaBr, $Mg(NO_3)_2$, $Fe(NO_3)_3$, $Ca(NO_3)_2$, $Zn(NO_3)_2$, $K_2CO_3$, $KC_2H_3O_2$, $Fe(SO_4)_3$, $CuSO_4$, mixtures of said compounds with $NH_4Cl$, KCl, KBr and $LiNO_3$; and complex sulfates and hydrates of said compounds, and mixtures of said compounds and hydrates.

31. The method according to claim 25 wherein component B is an aqueous solution of $CaCl_2$ and $FeCl_3$.

32. The method according to claim 25 wherein component B of the fluid composition employed is an aqueous solution of $Ca(NO_3)_2$ and $Fe(NO_3)_3$.

33. The method according to claim 25 wherein component B of the fluid composition employed is $Mg(NO_3)_2$ and $Fe(NO_3)_3$.

34. The method according to claim 25 wherein component B of the fluid composition employed is $CaCl_2$ and $AlCl_3$.

35. The method according to claim 25 wherein component B is an aqueous solution of $CaCl_2$ and $ZnCl_2$.

36. The method according to claim 25 wherein the opening being sealed off is the annulus between a confining enclosing structure about a borehole penetrating an earthen formation and the formation wall.

37. The method according to claim 25 wherein the opening being sealed off is the annulus between two concentric pipes.

38. The method according to claim 25 wherein the opening being sealed off is that created when a pavement is raised from the earth's surface.

39. The method according to claim 25 wherein the opening being sealed off is that existing between tunnel walls and an earthen formation.

40. The method according to claim 25 wherein the opening being sealed off is a conduit for fluids.

41. The method of sealing off openings which comprises emplacing, in combination, into the opening a composition consisting essentially of: component (A) an anhydrous particulated water dispersible acrylamide polymer selected from the class consisting of (1) linear and limited cross-linked polymerized acrylamide, (2) copolymers prepared by polymerizing at least 90 percent by weight acrylamide and balance an ethylenically unsaturated monomer copolymerizable therewith, to make a water-dispersible copolymer, selected from the class consisting of acrylic acid, methacrylic acid, vinylsulfonic acid, vinylbenzyltrimethylammonium chloride, vinylbenzylsulfonic acid, vinylbenzenesulfonic acid, and alkali and alkaline earth metal salts of said acids, and (3) mixtures of (1) and (2) and component (B) an aqueous solution of an inorganic compound selected from the class consisting of inorganic water-soluble hydroxides and salts in an amount sufficient to reduce the aqueous tension of pure water to a positive final aqueous tension value at the temperature employed of not greater than about 10 millimeters of mercury where the linear and cross-linked polyacrylamide polymer and copolymer is about 90% unhydrolyzed and to not greater than about 20 millimeters of mercury in polyvalent cation solutions where the polyacrylamide is about 60% unhydrolyzed, and not in excess of the amount of the compound necessary to saturate the water at said temperature, component A being employed in an amount of between about 0.5 and about 5.0 pounds per gallon of total slurry at a temperature between the freezing point and the boiling point of component B and allowing the fluid composition so emplaced to stand within said temperature range until the fluid composition gels to a resilient fluid-tight solid and emplacing adjacent to and in contact with said composition an expansive Portland cement of improved hydraulic bond strength to a surface, when admixed with an aqueous liquid selected from the class consisting of water and brine and allowed to set to a unitary solid in contact with said surface and said composition comprising components A and B which comprises admixing per 100 parts of Portland cement between about 5 and 95 parts of finely subdivided calcium sulfoaluminate clinker which upon ignition consists essentially of about 4 moles of CaO, 3 moles of $Al_2O_3$, and 1 mole of $SO_3$.

42. The method according to claim 25 wherein the polymer employed is linear polyacrylamide having a molecular weight of from about 10,000 to about 5,000,000.

References Cited by the Examiner
UNITED STATES PATENTS

| | | | |
|---|---|---|---|
| 2,684,720 | 7/1954 | Lea | 166—31 |
| 3,056,757 | 10/1962 | Rakowitz | 260—29.6 |
| 3,210,310 | 10/1965 | Holbert et al. | 260—29.6 |
| 3,252,904 | 5/1966 | Carpenter | 252—8.55 |

MURRAY TILLMAN, *Primary Examiner.*

GEORGE F. LESMES, *Examiner.*

W. J. BRIGGS, SR., *Assistant Examiner.*